United States Patent [19]

Shimada et al.

[11] Patent Number: 4,550,434
[45] Date of Patent: Oct. 29, 1985

[54] LINE RECOGNITION

[75] Inventors: Shigeru Shimada; Shigeru Kakumoto, both of Kodaira; Osamu Abe, Tokyo, all of Japan

[73] Assignee: Hitachi, Ltd., Tokyo, Japan

[21] Appl. No.: 494,445

[22] Filed: May 13, 1983

[30] Foreign Application Priority Data

May 14, 1982 [JP] Japan .................................. 57-79942

[51] Int. Cl.[4] .............................................. G06K 9/20
[52] U.S. Cl. ......................................... 382/9; 382/48; 382/61
[58] Field of Search ................... 382/9, 44, 45, 48, 61; 358/107; 250/556

[56] References Cited

U.S. PATENT DOCUMENTS

| | | | |
|---|---|---|---|
| 4,147,928 | 4/1979 | Crean et al. | 382/44 |
| 4,249,217 | 2/1981 | Korte et al. | 382/44 |
| 4,272,756 | 6/1981 | Kakumoto et al. | 382/23 |
| 4,428,077 | 1/1984 | Shimada et al. | 382/9 |

Primary Examiner—Leo H. Boudreau
Assistant Examiner—Jacqueline Todd
Attorney, Agent, or Firm—Antonelli, Terry & Wands

[57] ABSTRACT

A line recognition adapted for recognizing a drawing in which a plurality of lines overlapping one another are indicated by a given one of the mutually overlapping lines and overlap symbols representative of the other lines. The overlap symbols are so configured as to give information as to line kinds of the other lines such as solid line, dash line and chain line and/or information as to colors of the other lines. The paths of the other lines are estimated on the basis of the overlap symbols as well as the positions at which they are inserted, for thereby recognizing the whole line paths or patterns of the drawing.

25 Claims, 18 Drawing Figures

FIG. 8

| | | |
|---|---|---|
| $L_1$ | 2 | NO. OF SEG. DEF. POINTS |
| | 0 | LINE KIND ID. |
| | 0 | START PT. DATA |
| | 0 | END PT. DATA |
| | $(x_{S1}, y_{S1})$ | START PT. COORD. |
| | $(x_{E1}, y_{E1})$ | END PT. COORD. |
| $L_2$ | 3 | |
| | 0 | |
| | 0 | |
| | 0 | |
| | $(x_{S2}, y_{S2})$ | |
| | $(x_{B1}, y_{B1})$ | BEND. PT. COORD. |
| | $(x_{E1}, y_{E1})$ | |
| $L_3$ | 2 | |
| | 0 | |
| | 0 | |
| | 0 | |
| | $(x_{S3}, y_{S3})$ | |

FIG. 9

| | | |
|---|---|---|
| $L_4$ | 2 | |
| | 0 | |
| | 2 | |
| | 2 | |
| | $(x_{S4}, y_{S4})$ | |
| | $(x_{E4}, y_{E4})$ | |
| $L_5$ | 7 | |
| | 0 | |
| | 0 | |
| | 0 | |
| | $(x_{S5}, y_{S5})$ | |
| | $(x_{B1}, y_{B1})$ | BEND. PT. (1) COORD. |
| | $(x_{B2}, y_{B2})$ | BEND. PT. (2) COORD. |

FIG. 14

| | | |
|---|---|---|
| I | CN | NO. OF CROSS PT. OR TOUCH PT. |
| | CP | ID. NO. OF C. OR T. PT. (A) |
| | $LW_1$ | DIST. FROM SYM. TO C. OR T. PT. |
| | $LAP_1$ | M. AD. OF CHAR. DATA IN RANGE |
| | $LAS_1$ | M. AD. OF S. PT. OF SEG. WITH C. OR T. PT. |
| | $LAE_1$ | M. AD. OF E. PT. OF SEG. WITH C. OR T. PT. |
| | $(CX_1, CY_1)$ | COORD. OF C. OR T. PT. |
| II | CP | (B1) |
| | $LW_2$ | |
| | $LAP_2$ | |
| | $LAS_2$ | |
| | $LAE_2$ | |
| | $(CX_2, CY_2)$ | |
| | $MAP_2$ | M. AD. OF CHAR. DATA OF C. OR T. LINE |
| III | CP | (B2) |
| | $LW_3$ | |
| | $LAP_3$ | |
| | $LAS_3$ | |
| | $LAE_3$ | |
| | $(CX_3, CY_3)$ | |
| | $MAP_3$ | |
| | $MAS_3$ | M. AD. OF CHAR. PT. AT ONE E. OF C. SEG. |
| IV | CP | (B2) |
| | $LW_4$ | |
| | $LAP_4$ | |
| | $LAE_4$ | |
| | $(CX_4, CY_4)$ | |
| | $MAP_4$ | |
| | $MAE_4$ | M. AD. OF CHAR. PT. AT OTHER E. OF C. SEG. |

(a)   (b)

LINE RECOGNITION

CROSS REFERENCES TO RELATED APPLICATIONS

This application relates to the subject matters disclosed in U.S. Pat. No. 4,272,756 issued to Kakumoto et al on June 9, 1981 and assigned to the present assignee, and in U.S. Pat. No. 4,428,077, issued to Simada et al on Jan. 24, 1984, and assigned to the present assignee.

BACKGROUND OF THE INVENTION

The present invention relates to the automatic reading of a line drawing and more particularly to the automatic recognition of a drawing including a portion in which a plurality of lines of different types or kinds and/or colors extend along the same path in a mutually overlapping or superposed relation and in which a given one of the plural lines is actually drawn while the remaining overlapping line or lines are represented, respectively, by corresponding overlap symbols marked in association with the given line.

When a line pattern or drawing having an area where a plurality of lines of different line types or kinds and/or colors are drawn to extend along the same path in a mutually overlapping or superposed relation, as is the case with mask patterns employed in manufacturing LSI circuits, is to be stored in a memory of a computer, it has heretofore been common in practice that such area is manually designated by an operator with the aid of a table. For reducing the burden of the operator, it is of course desirable that the line pattern is automatically recognized with the resulting data being inputted to the computer. However, a problem arises in this connection in that the line pattern including the mutually overlapping lines is drafted in a variety of different ways in dependence on the preferance of the draftsmen. Supposing, for example, that a line of type or kind A overlaps a line of a kind B in a drawing, one draftsman may draw the pattern with both kinds (A and B) of lines being intermingled, while another draftsman may omit one line and use a symbol representing omission or overlap of that line. In other words, representation of a line pattern including mutually overlapping lines or segments differs in dependence on the draftsmen, resulting in great difficulty in the automatic recognition of line patterns.

SUMMARY OF THE INVENTION

It is an object of the present invention to provide automatic line recognition which is capable of automatically and discriminatively recognizing a line pattern or drawing which contains a part or parts where a plurality of lines of different kinds and/or colors are drawn in a mutually overlapping relation.

It is proposed according to an aspect of the present invention that a drawing or line pattern is drafted in accordance with such rules that a line which is to be drawn so as to overlap a given line is replaced by a symbol referred to as an overlap symbol which represents the type or kind and/or color of the overlapping line and is inserted at a location associated with the given line, so that upon recognition of the whole line pattern, the overlapping line or lines may be discriminatively and individually estimated with the location of the overlap symbol as well as the configuration thereof being utilized as a clue to the estimation.

BRIEF DESCRIPTION OF THE DRAWINGS

FIG. 8 is a view illustrating an exemplary set of characteristic point data obtained through processings executed by the line recognition system shown in FIG. 1.

FIG. 9 is a view for illustrating another example of characteristic point data produced by processings executed by the line recognition system shown in FIG. 1.

FIG. 14 is a view for illustrating data produced by the searching processings shown in FIG. 13.

DESCRIPTION OF THE PREFERRED EMBODIMENTS

Figure 1:
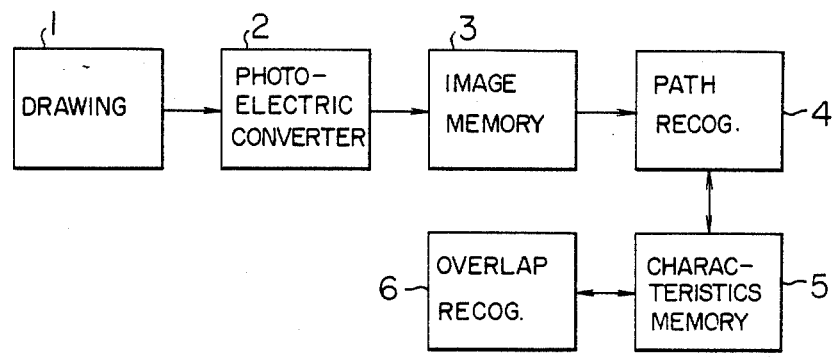
FIG. 1 shows in a block diagram a general arrangement of a line recognition system which may be employed for carrying out an embodiment according to the invention.

FIG. 1 shows in a block diagram a general arrangement of a line pattern recognition apparatus for carrying out line recognition according to an embodiment of the present invention. In this figure, a reference numeral 1 denotes a drawing or line pattern which constitutes the object to be recognized, 2 denotes a photo-electric converter, 3 denotes an image memory, 4 denotes a line path recognition device, 5 denotes a characteristic (or feature) point memory, and finally numeral 6 denotes an overlapping line recognition device.

Figure 2:
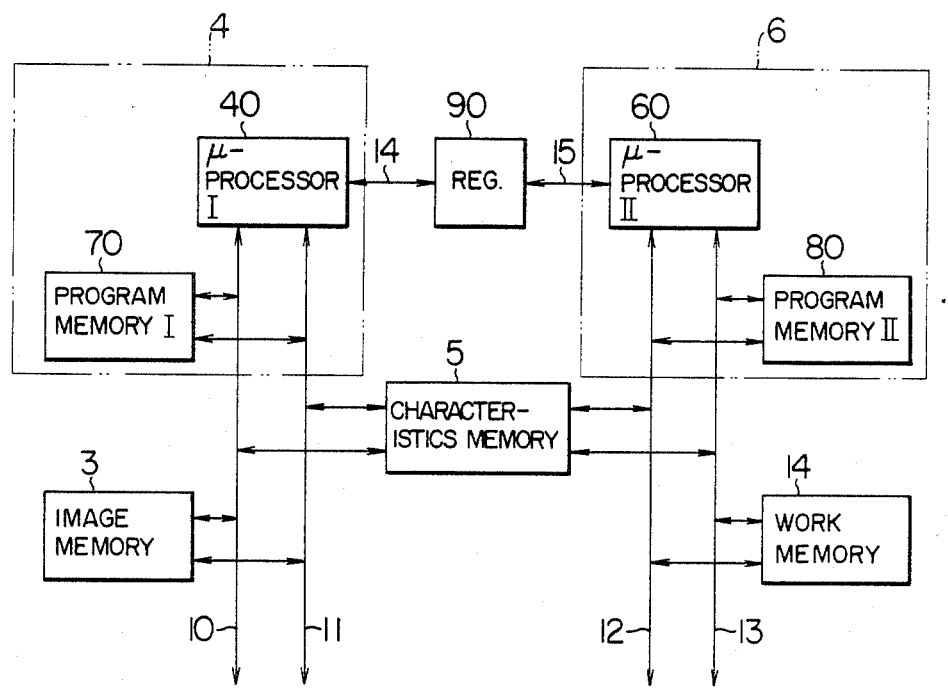
FIG. 2 is a block diagram showing in detail a main portion of the line recognition system shown in FIG. 1.

FIG. 2 shows a more detailed circuit arrangement for the image memory 3, the line path recognition device 4, the characteristic point memory 5 and the overlapping line recognition device 6. The line path recognition device 4 is constituted by a microprocessor I 40 and a program memory I 70, wherein the microprocessor I 40 can make access to the image memory 3 and the characteristic point memory 5 by way of a data bus 10 and an address bus 11. The overlapping line recognition device 6 is constituted by a microprocessor II 60 and a program memory II 80, wherein the microprocessor II 60 can make access to the characteristic point memory 5 and a work memory 14 by way of a data bus 12 and an address bus 13. Further, the microprocessors I and II 40 and 60 can access a register 90 through a data bus 14 and a data bus 15, respectively. The register 90 is adapted to store therein the status indicating which microprocessor I or II is making access to the characteristic point memory 5 on the one hand and the status indicating whether the microprocessors I and II have completed the respective processings.

In connection with the line recognition system outlined above, the drawing or line pattern 1 which constitutes the object for recognition is now assumed to be drafted in accordance with the rules mentioned below.

Rules for Drawing (1) Overlap-representing symbols are used in correspondence with kinds or species of overlapping lines which are to be omitted from representation.

Figure 3:
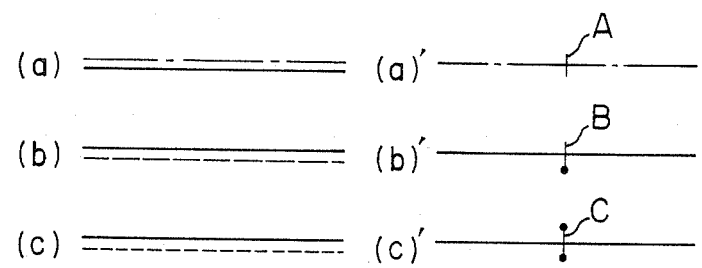
FIG. 3 illustrates corresponding relationships between overlap symbols and lines represented by them.

By way of example, when a black chain line (long-and-short broken line) and a black solid line overlap each other as shown in FIG. 3 at (a), a solid line segment A of a short length is inserted so as to intersect the black chain line as the overlap symbol for indicating that the black solid line overlies the black chain line, as is illustrated at (a') in FIG. 3. In case a black solid line and a long dash line overlap each other, as shown in FIG. 3 at (b), the corresponding overlap symbol is formed by a black solid line segment B which is attached with a solid circle at one end and so inserted as to intersect the solid black line in such manner as illustrated at (b') in FIG. 3. When a black solid line overlies a black dash line, as shown in FIG. 3 at (c), a short black solid line segment C attached with solid circles at both ends, respectively, intersects the black solid line to constitute the corresponding overlap symbol representing the omitted black dash line, as is illustrated at (c') in FIG. 3. When a line represented by the overlap symbol has a specific color, the corresponding overlap symbol is also drawn in the specific color. It should however be noted that the overlap symbols A, B and C mentioned above are shown only for the purpose of illustration. Symbols having other configurations which represent definitely the omitted overlapping lines can of course be made use of.

(2) When N lines of different kinds or species where $N \geq 2$ are to be draw in overlapping relation along the same line path, only an arbitrarily selected one of these lines is drawn while the other lines are omitted, wherein overlap symbols (i.e. symbols of omission) corresponding to the kinds of the $(n-1)$ lines as omitted are attached to the drawn line.

Figure 4:
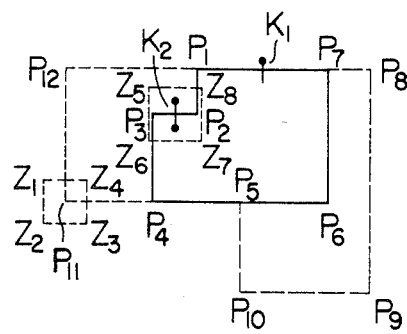
FIG. 4 shows an example of a line pattern in which some lines are represented by corresponding overlap symbols.

By way of example, with reference to FIG. 4, in case of a drawing or line pattern where there exists a black solid line path extending from a point $P_1$ through $P_2$, $P_3$, $P_4$, $P_6$ and $P_7$ back to $P_1$ together with a black dash line path or route extending from the point $P_1$ through $P_{12}$, $P_{11}$, $P_4$, $P_3$ and $P_2$ back to $P_1$ and a black long dash line path extending from the point $P_7$ through $P_1$, $P_2$, $P_3$, $P_4$, $P_5$, $P_{10}$, $P_9$ and $P_8$ back to $P_7$, the black long dash line, the black dash line and the solid line overlap one another along the path defined by $P_1$, $P_2$, $P_3$ and $P_4$, while the black long dash line and the black solid line overlap each other along the path segments defined by the points ($P_1$; $P_7$) and ($P_4$; $P_5$), respectively. On these conditions, the black solid line path segment defined by the points $P_1$, $P_2$, $P_3$ and $P_4$ is provided with the symbol representing the presence of the black dash line, this symbol being designated by $K_2$. Further, the path segment defined by $P_1$ and $P_7$ is provided with the symbol $K_1$ representing the superposition of the black long dash line as omitted.

(3) The symbol representative of overlap is inserted at an arbitrarily selected position on the path along which one and the same kind of line extends continuously.

By way of example, reference is made to FIG. 4. The overlap symbol $K_2$ may be entered at an arbitrary position on the black solid line path $P_1$-$P_2$-$P_3$-$P_4$, while the symbol $K_1$ may also be inserted in the path segment $P_7$-$P_1$-$P_2$-$P_3$-$P_4$-$P_5$ at a given position.

The drawing or line pattern 1 drafted in accordance with the rules mentioned above is read by the photoelectric converter means 2, such as a television camera, a drum scanner or the like, to be converted into electric signals which represent image data at various locations of the line pattern 1. The electric signals thus obtained are stored in the image memory 3 at storage addresses corresponding to the locations of the drawing 1 at which the video signals are derived, respectively.

In case the drawing or line pattern 1 is drawn in a single color, the electric signal mentioned above is composed of binary signal components representative of light and shade. On the other hand, when the line pattern 1 is drawn in several colors, the electric signal contains signal components representative of the colors in addition to the binary signal components.

The microprocessor I denoted by 40 in FIG. 2 is destined to execute a line path recognition processing program which is stored in the program memory I (denoted by 70). This processing is composed of two sub-processings, i.e. the characteristic point extracting processing and the broken line recognition processing. The phrase "broken line" is used with intention to encompass the dash line, the long dash line and the chain line. In the execution of the line path recognition processing, the characteristic or feature points (P) on a line path are discriminatively detected on the basis of the image data and transferred to the characteristic point memory 5 to be stored therein. The contents of these recognition processings will be described below in more detail on the assumption that the object or line pattern (drawing) to be recognized is drawn in white and black. With regards to the drawings in several colors, description will be made only in respect to the difference from the former.

(1) Processing For Extracting Characteristic (Feature) Points

Figure 5:
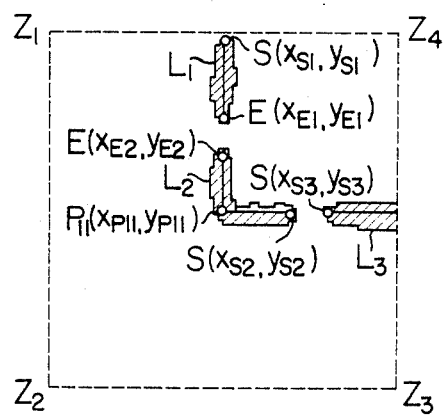
FIG. 5 a fragmental enlarged view showing a portion of FIG. 4.
Figure 6:
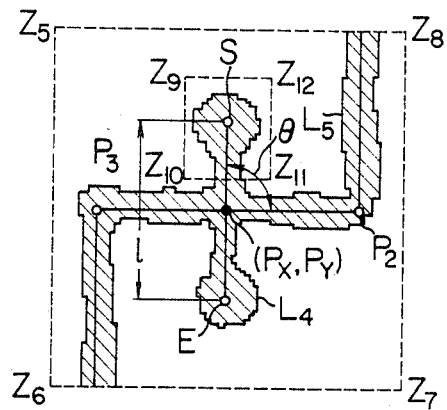
FIG. 6 is a fragmental enlarged view showing another portion of FIG. 4.
Figure 7:
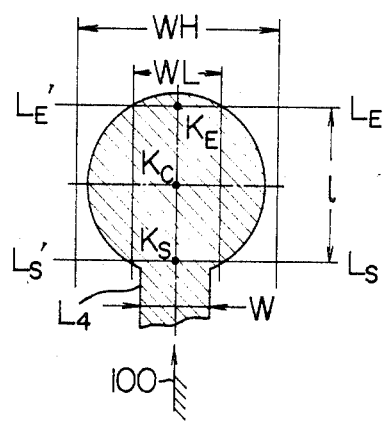
FIG. 7 is a schematically enlarged fragmental view of FIG. 6.

It is assumed that the image data for the line pattern shown in FIG. 4 is stored in the image memory 3. In the characteristic point extracting processing, the characteristic or feature points such as start terminal points, end terminal points and bending points are identified or recognized from the image data representative of line segments. More specifically, reference is made to FIG. 5 which shows in an enlarged view a region defined by points $Z_1$, $Z_2$, $Z_3$ and $Z_4$ shown in FIG. 4. The term "line segments" or simply "segments", refers to those lines which extend individually in continuation, as indicated by reference letters $L_1$, $L_2$ and $L_3$ in FIG. 5, wherein the start terminal point of each of the line segments $L_1$, $L_2$ and $L_3$ is designated by a reference letter S and represents one end point of a given line segment, while the end terminal point designated by E represents the other end point of the given line segment. The bending point represents a bend on the line segment extending contiguously, such as the point $P_{11}$. Accordingly, it can be said that a closed line pattern is composed of a single line segment having a start terminal point and an end terminal point coinciding with each other at one and the same position and a number of bending points, while a single broken line is composed of a succession of small segments each having a start terminal point and an end terminal point, some of the broken lines including additionally one or more bending points. A typical one of the known characteristic point extraction processings is disclosed in Kakumoto et al's article "Logic Diagram Recognition by Divide and synthesize Method" appearing in "Proceedings of the IFIP Working Conference organized by Working Group 5.2, Computer Aided Design", Grenoble France, March 17-19, 1978, pp. 457-470. The characteristic point extraction processing is assumed to be executed by resorting to this known method according to which a scanning circular arc of a predetermined radius is moved over line segments or components in a line pattern image to detect the number of lines which intersect the circular arc and the angles which the line segments form with the circular arc. When the number of the line segments which intersect the circular arc is found to be equal to 1 (one), it is determined that the line segment in question has a start terminal point and an end terminal point. On the other hand, provided that the number in question is two and that the angle of intersection is greater than a predetermined value, it is determined that the line segment as scanned has at least one bending point. In this connection, it should be mentioned that the terminal point which has first been detected in the characteristic point extraction processing is referred to as the start terminal point, while the last found one is referred to as the end terminal point. In accordance with this characteristic point recognition method as outlined above (for more particulars, reference may be made to the above cited literature), position coordinates of the characteristic points as well as the kinds or species of the characteristic points (i.e. whether they are the start terminal point, the end terminal point or the bending points) are recognized and extracted from the image data or line pattern data illustrated in FIG. 5 for each of the line segments, whereby the data of characteristic (feature) points is determined from the results of the recognition processing and subsequently stored in the characteristic point memory 5 (FIG. 1). An exemplary set of data resulting from the characteristic point extraction processing mentioned above is illustrated in FIG. 8 in which the characteristic point data for the line segments $L_1$, $L_2$ and $L_3$ shown in FIG. 5 are exemplified at lefthand portions of respective storage areas. Referring to FIG. 8, the first line for each line segment represents "number of segment constituents or segment defining points" which means the number of the characteristic points which take part in defining a single line segment. In case of the line segment $L_1$ shown in FIG. 5, the number of segment constitutents is equal to two because this line is defined only by a start terminal point (S) and an end terminal point (E). In case of the line segment $L_2$, the number of segment constituents equals 3, because this line segment has a start terminal point (S), an end terminal point (E) and a bending point (P). Further, a line kind (species) identifying number entered in the registration table shown in FIG. 8 represents the kind or species (sort) of the line in question, i.e. whether the line is a black solid line, a black dash line or a black long dash line. The line kind identifying number shown in the second line which also can be used to discriminate the color of the line segment is determined through the processing for recognizing the broken line species which will be described hereinafter. In the table shown in FIG. 8, the number 0 (zero) representative of the initial value is stored. The start point information and the end point information tell whether these points (i.e. the start terminal point and the end terminal point) are isolated in the drawing or are depicted in solid circles or connected to other line segments. These states of the terminal points are correspondingly represented by numerals 0, 2 and 3, respectively. In case of the line pattern or drawing shown in FIG. 5, the terminal points of any line segments $L_1$, $L_2$ and $L_3$ are isolated and thus represented by 0 (zero), respectively, in FIG. 8. In contrast, in the line pattern shown in FIG. 6 which is a fragmental enlarged view showing a region defined by $Z_5$, $Z_6$, $Z_7$ and $Z_8$, there is present a line segment $L_4$ (overlap symbol) having solid circles at the start terminal point S and the end terminal point E, respectively. Accordingly, both the start point information and the end point information for this line segment $L_4$ (corresponding to the overlap symbol C shown in FIG. 3) assume the value of 2, respectively. Recognition as to the presence or absence of the solid circle at the terminal point is effected as a part of the processing for extracting the characteristic points such as the start terminal point, the end terminal point and the bending point immediately after these characteristic points have been extracted. Here, a method of recognizing the solid circle will be elucidated. FIG. 7 shows in a fragmental enlarged schematic view a region defined by points $Z_9$, $Z_{10}$, $Z_{11}$, and $Z_{12}$ in FIG. 6. The line segment $L_4$ has been previously recognized to be independent of the line segment $L_5$ through the processing for recognition of the characteristic points of the line segment $L_5$ because the line segment $L_4$ intersects the latter perpendicularly thereto. Referring to FIG. 7, it is assumed that the characteristic point extraction processing for the line segment $L_4$ is effectd in the direction indicated by an arrow 100. In this processing, the length l of a section of the line segment $L_4$ is determined in which the width W remains within a predetermined range:

$$WL < W < WH$$

where WL represents a predetermined minimum width and WH represents a predetermind maximum width. Next, a section L is determined in which the value of l lies within a range defined below:

$$LX - \epsilon < l < LX + \epsilon$$

where LX represents the center value of the range and $\epsilon$ represents a parameter prescribing extension of the range. The starting line of this section L is represented by $L_S-L_S'$ with the end line being represented by $L_E-L_E'$. Further, the point at which the center line intersects the start line $L_S-L_S'$ is represented by $K_S$ while the point where the center line intersects the end line $L_E-L_E'$ is represented by $K_E$. Then, the center point $K_C$ of the solid circle is given by the mid point of the line segment interconnecting the intersections $K_S$ and $K_E$. Around the center point $K_C$, the black area within the solid circle is radially scanned. Subsequently, a flag indicative of the completed processing is set, and the start point information or the end point information, as the case may be, of the point corresponding to the center $K_C$ is set at the number "2" which represents the presence of the solid circle. FIG. 9 shows data of the characteristic points produced by the characteristic point extraction processings for the line segments $L_4$ and $L_5$ shown in FIG. 6. The start point information and the end point information of the line segment $L_4$ which is assumed to have solid circles at both ends are set, respectively, to the value of 2. The characteristic point extraction processing is repeated until all the line segments of a line or image pattern which constitutes the object to be recognized have been processed in the manner described above.

(2) Processing For Recognition Of Broken Lines

The broken line recognition processing is carried out on the basis of the data stored in the characteristic point memory 5. A typical one of the broken line recognition method is disclosed in U.S. patent application Ser. No. 181,774 (Japanese Patent Application No. 11761/1979). At first, a candidate for the broken line segment is extracted. The broken line is recognized as a set of line segments which have respective terminal points located adjacent to one another and each of which has a length within a predetermined range. The individual segments constituting a broken line are sequentially connected together to be recognized as a single broken line (i.e. dash line, long dash line or chain line). The data of the start terminal point, the end terminal point and the bending point which are required for defining the line obtained as a result of the connection processing are stored in the characteristic point memory 5 shown in FIG. 1 as the characteristic point data for the broken line in question in the same format as those shown in FIGS. 8 and 9. The characteristic point data for the solid lines are held intact as they are. In the broken line recognition, the kinds or sorts (species) of the different broken lines (e.g. dash line, long dash line, chain line and the like) are also recognized. Thus, the line-kind-identifying numbers for the black solid line, the black dash line and the black long dash line and the like are set, respectively, at corresponding values of 1, 2 and 3 and so forth to be stored at the line kind identifying number storage areas. Through the broken line recognition processing described above, the data for the solid line $P_1-P_2-P_3-P_4-P_6-P_7-P_1$, the solid lines representing the center lines of the overlap symbols $K_1$ and $K_2$, the dash line $P_1-P_{12}-P_{11}-P_4$ and the long dash lines $P_7-P_8-P_9-P_{10}-P_5$ are stored in the characteristic point memory 5.

When the line path recognition processing has been completed, the microprocessor I 40 sets a flag indicating the end of the recognition processing in the register 90. The microprocessor II 60 shown in FIG. 2 reads out the content of the register 90 to check whether the line path recognition processing executed by the microprocessor I 40 has been completed. If so, the microprocessor II then executes the overlapping line recognition processing program stored previously in the program memory II 60. The overlapping line recognition processing includes two sub-processings: the overlap symbol recognition sub-processing and the overlapping line path recognition sub-processing. In this overlapping line recognition processing, the overlap symbols are discriminatively recognized from the line data stored in the characteristic point memory 5. After the recognition of the paths of the overlapping lines, the path information or data is again stored in the characteristic point memory 5. Data of those lines which have been recognized to represent the overlap symbols are erased from the characteristic point memory 5. The overlap symbol recognition sub-processing as well as the overlapping line path recognition sub-processing will be described below in detail.

(3) Overlap Symbol Recognition Processing

Figure 10:
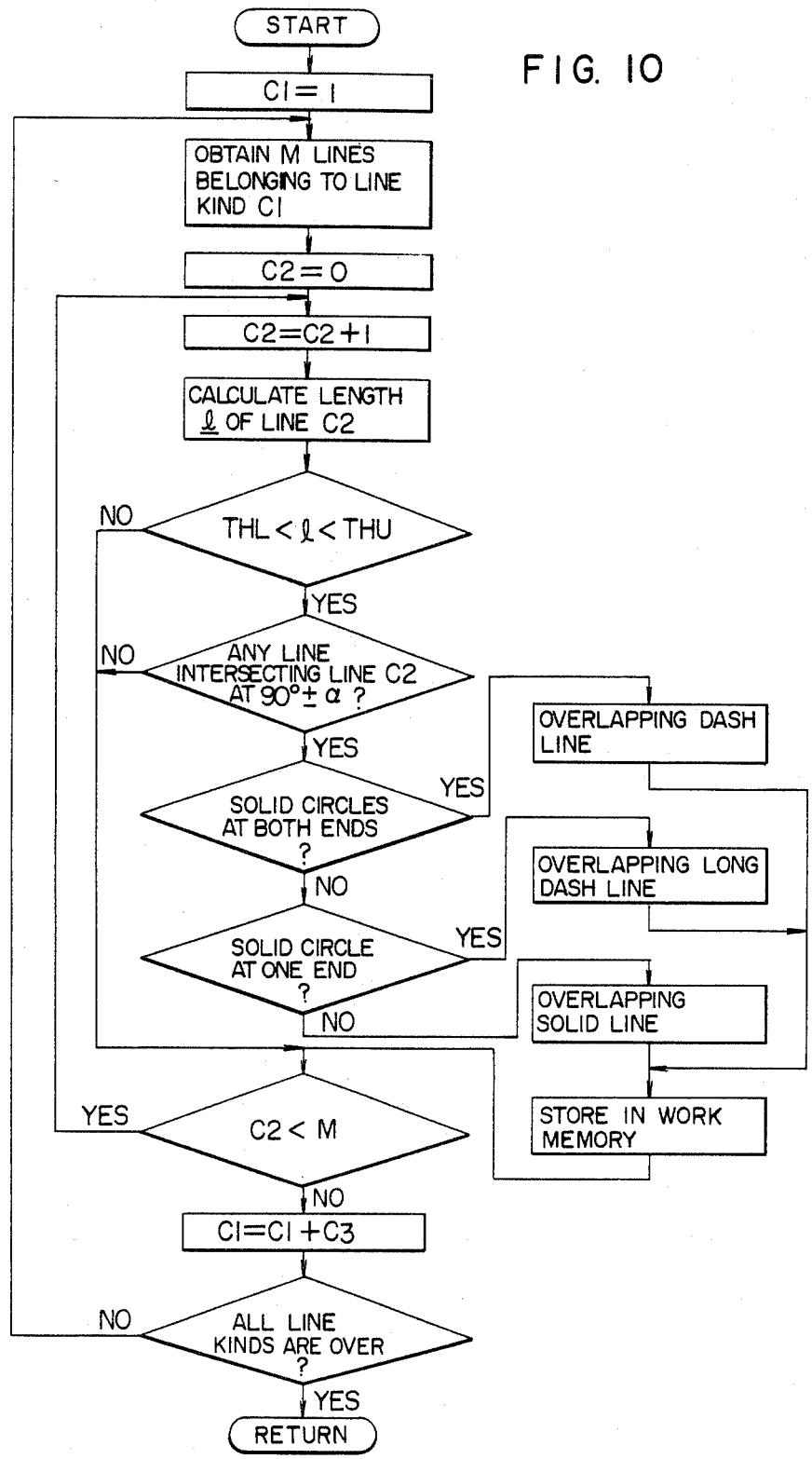
FIG. 10 is a flow chart for illustrating a flow of overlap symbol recognition processings.

FIG. 10 illustrates in a flow chart an example of the processing for recognition of the overlap symbol. The line-kind-identifying number is represented by $C_1$ in such a manner that $C_1=1$ for a solid line in black, $C_1=2$ for a dash line in black, $C_1=3$ for a long dash line in black, $C_1=4$ for a solid line in red, $C_1=5$ for a dash line in red, $C_1=6$ for a long dash line in red and so on, by way of example.

Figure 11:
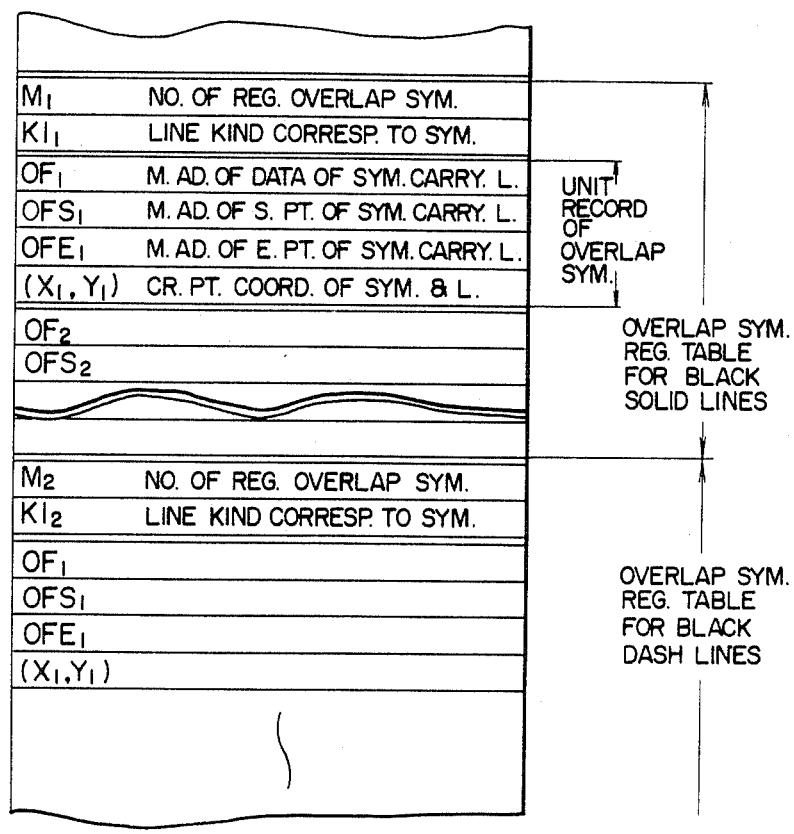
FIG. 11 is a view for illustrating data produced by the overlap symbol recognition processing.

In case $C_1=1$, the processing mentioned in the following is executed for recognizing the solid line representative of the overlap symbol. Upon completion thereof, the number of $C_1$ is updated by three, which is followed by repetition of the same processing. The reason for updating $C_1$ by three as mentioned above is because the overlap symbol is constituted by a solid line and because the black lines are identified by the serial numbers 1, 2 and 3 in dependence on the line kinds or species (solid, dash or long dash), which is followed by the serial numbers 4, 5 and 6 representing the line kinds or species of the red lines in the same manner and so forth. Assuming now that the drawing or line pattern which is the object for recognition is drawn only in black, the processing is executed for the case where $C_1=1$, since the line segment of the overlap symbol is a solid line. At first, a number (M) of those lines which are stored in the characteristic point memory 5 and assigned with the line kind identifying number $C_1$ ($=1$) are selected. Among the M lines, the length l of the line of a registration number $C_2$ (where $C_2=1, 2, \ldots$ or M) is determined in terms of the coordinates of the start terminal point, the end terminal point and the bending point. It is then checked whether the length l falls within a predetermined range of the length which the overlap symbol line is to have. In other words, it is checked whether $THL < l < THU$, where THL represents a lower threshold value of the line length, while THU represents an upper threshold value of the line length. When the length l is out of the above range, the corresponding line can not be a candidate for the overlap symbol. Accordingly, the processing proceeds to the next line of a registration number $C_2+1$. When the length l of this line of the registration number $C_2+1$ is found to fall within the range defined above, all the lines stored in the characteristic point memory 5 are checked as to whether there is a line which intersects the above line $C_2+1$. In case no intersecting line is found, the processing proceeds to the next line numbered $C_2+2$. On the other hand, when the intersecting line is found to be present as is the case with the example illustrated in FIG. 6, the angle $\theta$ formed between the line $C_2+1$ and the intersecting line is determined. Unless the value $\theta$ belongs to the range:

$$90° - \alpha \leq \theta \leq 90° + \alpha$$

where $\alpha$ represents a parameter prescribing a permissible tolerance, the intersecting line can not be a candidate for the overlap symbol line. Accordingly, the processing proceeds to the next line of the registration number $C_2+2$. On the other hand, when the angle $\theta$ lies within the range defined above, the intersecting line is determined as the overlap symbol line and subsequently checked as to whether the start and the end point information thereof has been set to the value of "2" which indicates the presence of the solid circle. When information of both the start and end points of the intersecting line is found to correspond to "2", the intersecting line is determined as the overlap symbol representing an overlapping dash line which has been omitted from being drawn. On the contrary, when information of both the start and the end points are "0" (zero), it is determined that the intersecting line represents the overlap symbol corresponding to an overlapping solid line. The above processing is executed for M lines belonging to the line group identified by the line kind number $C_1$, which is followed by the similar processings for the lines of the different line-kind-identifying-numbers. The results of the overlap symbol recognition processings mentioned above are stored in the work memory 14 shown in FIG. 2 at areas reserved for each of the overlapping line kinds represented by the overlap symbols in a format shown in FIG. 11. This format is referred to as the overlap symbol registration table. Referring to FIG. 11, the number $M_i$ of the registered overlap symbols (where i=1 to n and n is an integer) represents the number of the overlap symbols having the corresponding line-kind-identifying numbers represented by $KI_i$ among the detected overlap symbols. Data $OF_i$, $OFS_i$ and $(X_i, Y_i)$ are stored as a unit record or set for every detected overlap symbol, among which $OF_i$ designates the location in the memory 5 where the characteristic point information or data of the line intersected by the overlap symbol is stored. For example, the data $OF_i$ for the line $L_5$ which is intersected by the overlap symbol $L_4$ (refer to FIG. 6) designates the heading or leading position (address) of the area at which the characteristic point data of the line $L_5$ is stored or registered in the characteristic point memory 5. Data $OFS_i$ and $OFE_i$ for the storage positions of the start and end terminal points, respectively, of a segment actually intersected by an overlap symbol designate, respectively, the locations of the memory 5 where the coordinates of the two characteristic points (given two of the bending point(s), the start point and the end point) of said segment which are located, respectively, toward the start and end terminal points of the line incorporating said segment are stored. In this connection, it is to be noted that the locations at which the start and end positions of the segment intersected by the overlap symbol are given in terms of difference in address from the location $OF_i$ at which the chatacteristic point data of the line to which said segment belongs is stored. By way of example, referring to FIG. 6, $OFS_i$ designates the location in the memory 5 at which the coordinates of the bending point $P_2$ located at one end of a segment $P_2$–$P_3$ constituting an integral part of the line $L_5$ and intersected by the overlap symbol $L_4$ are stored, while $OFE_i$ designates the location in the memory 5 at which the coordinates of the bending point $P_3$ coinciding with the other end of the same segment are stored. The position coordinates $(X_i, Y_i)$ of the overlap symbol represent the coordinates of the cross-point {$(P_X, P_Y)$ in the case of the illustration of FIG. 6} at which the overlap symbol $(L_4)$ intersects the line $(L_5)$.

The position (coordinates) of the cross-point or intersection is arithmetically determined on the basis of the coordinates of the bending points $P_2$ and $P_3$ and the coordinates of the start and end points of the overlap symbol. In this way, the overlap symbols $K_1$ and $K_2$ (refer to FIG. 4) are recognized, whereby the overlap symbol registration table is prepared in the manner illustrated in FIG. 11.

(4) Overlapping Line Path Recognition Processing

Figure 12:
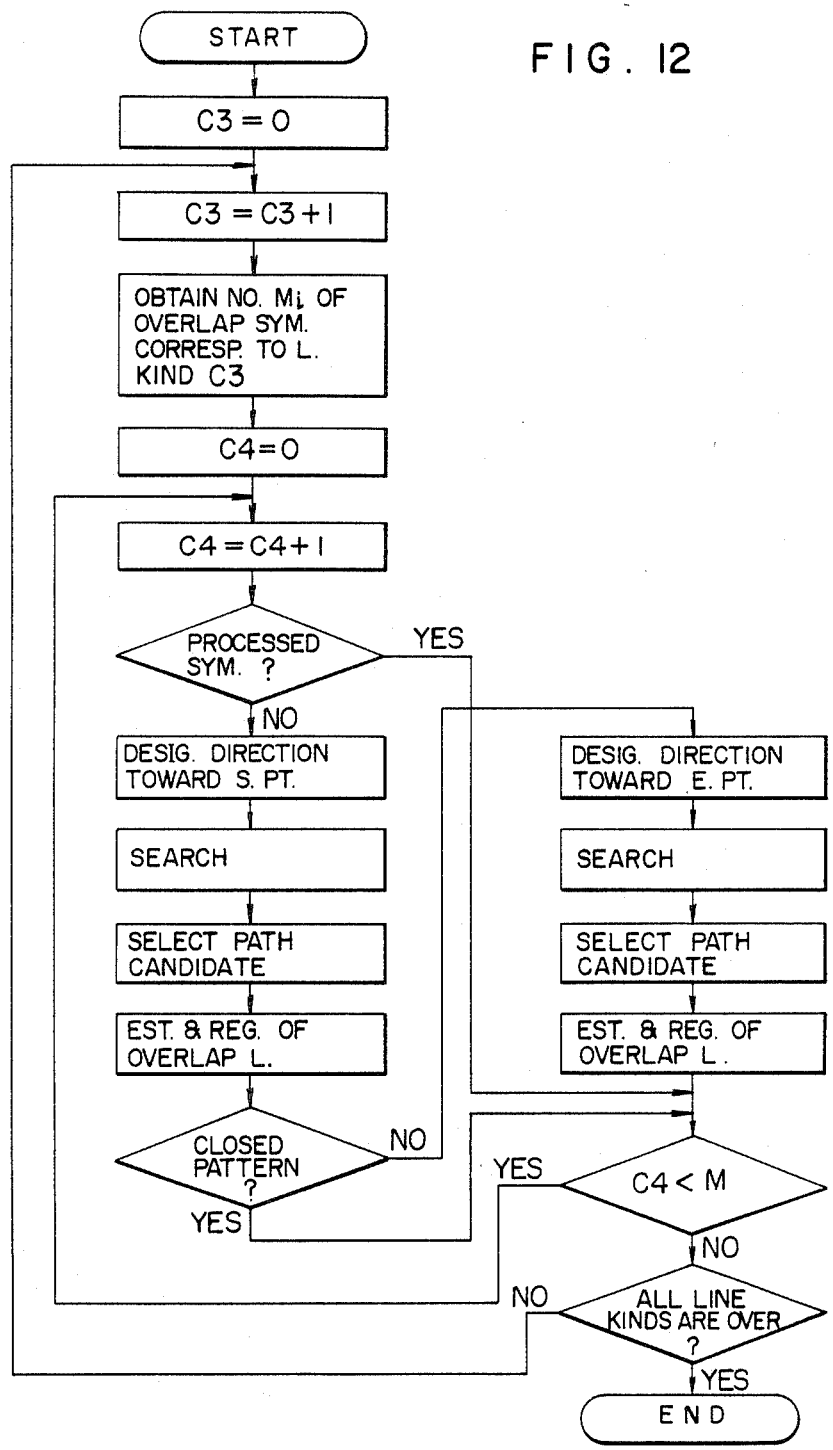
FIG. 12 is a view illustrating a flow of overlapping line path recognition processings.

FIG. 12 is a chart showing a general flow of the overlapping line path recognition processing. Referring to the figure, it is assumed that $C_3$ represents the line-kind-identifying number $KI_i$ corresponding to the overlap symbols registered in the overlap symbol registration table shown in FIG. 11. By way of example, this line-kind-identifying number $KI_i$ is set to 1, 2, 3, 4 and 5 for the overlap symbols which correspond to the black solid line, the black dash line, the black long dash line, the red solid line and the red dash line, respectively. At first, a number $(M_i)$ of the registered overlap symbols which have the line-kind-identifying numbers $KI_i$ equal to $C_3$ are detected from the overlap symbol registration table (FIG. 11). When the number of the record relating to the overlap symbols assigned with the line-kind-identifying number $KI_i$ in the overlap symbol registration table is represented by $C_4$, the processing mentioned below is repeated until $C_4$ becomes equal to $M_i$. However, those overlap symbols which have already been processed are skipped in the course of the processing mentioned below.

In the first place, starting from the positional coordinates $(X_i, Y_i)$ of an overlap symbol registered in the overlap symbol registration table (FIG. 11), the direction is designated in which the start point storage location $OFS_i$ of the segment attached with the overlap symbol is located. For example, in case of the example illustrated in FIG. 6, the direction in which the bending point $P_2$ is present as viewed from the location $(P_X, P_Y)$ at which the overlap symbol is present is designated, whereupon a series of processings including "search", "selection of a candidate for the overlapping line path" and "selection and registration of the overlapping line" are executed. When the overlapping line being searched through the overlapping line estimation and registration processing is found to be of a closed loop upon completion of the processing started from an overlap symbol toward the location at which the start point of the segment acutually intersected by the overlap symbol is stored, the processing is transferred to another overlap symbol. Otherwise, the direction in which the end point storage location $OFE_i$ of the segment attached with the overlap symbol is present as viewed from the position coordinates $(X_i, Y_i)$ of the same overlap symbol, i.e. the direction in which the bending point $P_3$ is located as viewed from the position $(P_X, P_Y)$ at which the overlap symbol is present is designated, whereupon the three processings mentioned above are executed. These processings are effected for all the overlap symbols registered in the overlap symbol registration table (FIG. 11).

The paths of the overlapping lines additively entered in the characteristic point memory through the overlapping line estimation and registration processing in this way may be left in the state in which the adjacent terminal points remain disconnected from each other, because the processings for determining the paths of the overlapping lines are executed separately for each of the overlap symbols. Accordingly, the adjacent terminal points have to be connected to each other through an overlapping line connection processing, as will be described hereinafter.

In the following, the individual processings "search", "selection of candidate for line path", "estimation and registration of overlapping line" and "connection of overlapping lines" will be separately elucidated in detail in this order.

Search

Figure 13:
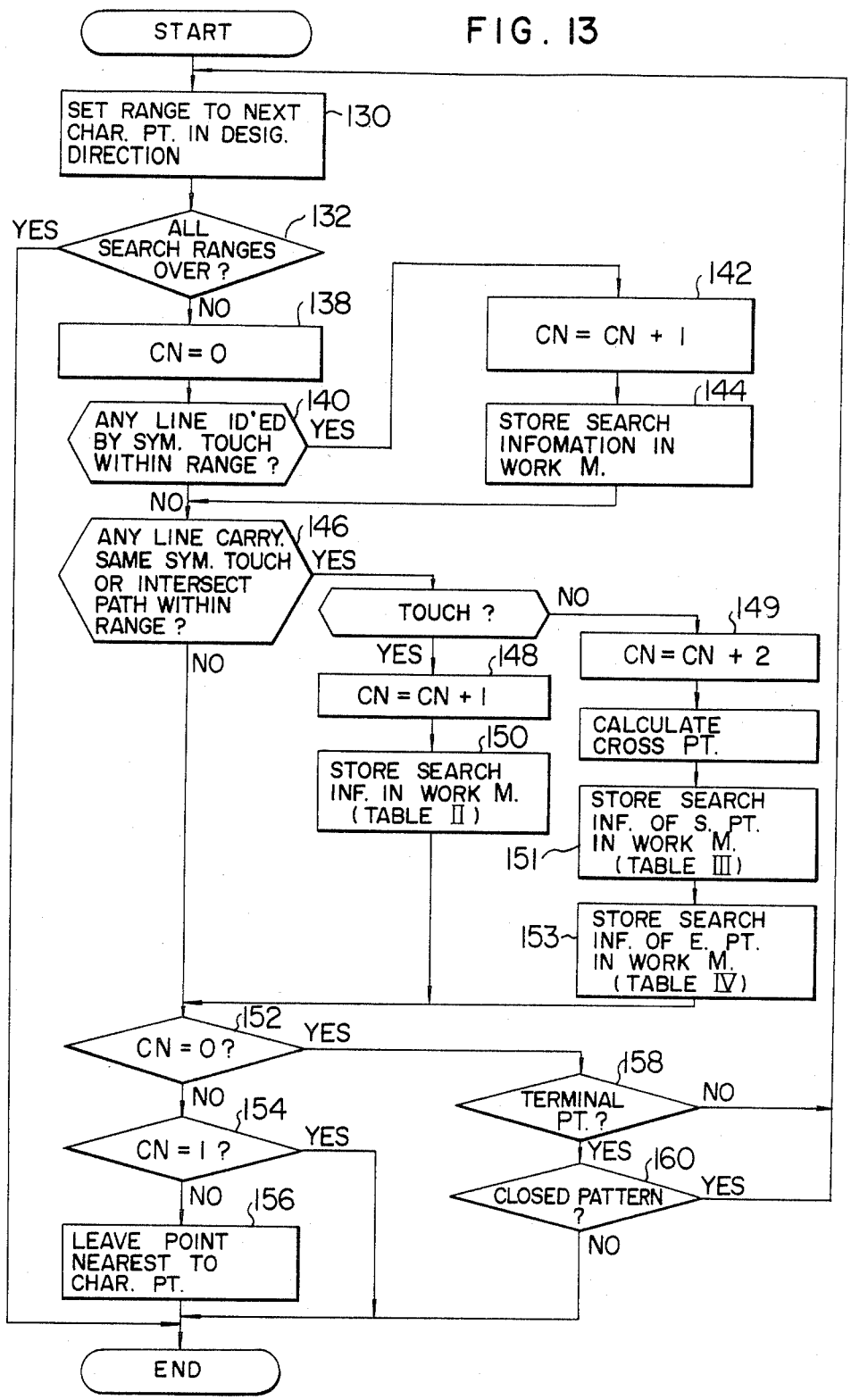
FIG. 13 is a flow chart for illustrating line path searching processings.

FIG. 13 shows a general flow of the search processing. At first, a range or window for a search is established which extends from the position coordinates ($X_i$; $Y_i$) of a given overlap symbol selected from the overlap symbol registration table shown in FIG. 1 to a next characteristic point of the line attached to the selected overlap symbol as viewed in the designated direction. By way of example, in the case of the illustration of FIG. 6, the range for search is so set as to cover the path extending from the position ($P_X$; $P_Y$) at which the overlap symbol is present to the point $P_2$ when the direction is designated toward the start point (step 130). Within this range, it is checked whether or not other line assigned with the line-kind-identifying number corresponding to that of the overlap symbol being examined touches the path being searched (steps 138 and 140). The touch of the other line means that a terminal point of this other line lies on the path being searched. More specifically, the presence of the line which touches the path being searched can be ascertained by examining the positions of the terminal points of all the lines assigned with the line-kind-identifying number which corresponds to that of the overlap symbol in question on the basis of the line information stored in the characteristic point memory 5. When the touch point (hereinafter referred to as the first kind or type of the touch point) is found to be present, a search information table shown in FIG. 14 is prepared in the work memory. In other words, a count value CN representative of the number of the cross-points or touch points is incremented by 1 (one), to thereby prepare the table I shown in FIG. 14 (steps 142 and 144). In FIG. 14, CP represents the identification number for a cross-point or touch point, which number CP is set equal to A in the case of the touch point of the first type defined above. When a plurality of the first type of touch points are present, the table I is prepared for each of them. In FIG. 14, a label $LW_1$ represents a distance along the searching path between the position of the cross-point or touch point and the position at which the overlap symbol for which search is being made is located. A label $LAP_1$ represents a storage location of the characteristic point memory 5 at which the characteristic point data of a line covered by the search range is stored. A label $LAS_1$ represents a storage location in the memory 5 at which the start point of the segment being checked and having a crosspoint or touch point is stored. A label $LAE_1$ represents the location in the memory 5 at which the end point of the segment on which the cross-point or the touch point lies is stored, and ($CX_1$; $CY_1$) represents the positional coordinates of the cross-point or the touch point. In the case of the example being considered, $LAS_1$, $LAE_1$ and ($CX_1$; $CY_1$) represent the corresponding data of the detected touch point of the first type.

Next, it is determined whether or not another line attached to the same overlap symbol as the one for which the search is initiated within the current search range intersects or touches the path being searched (step 146). Here, an intersection point is a point on the path being searched where another line has a point other than a terminal point thereof. That is, an intersection point is a point where another line crosses the path or has a bending point. More specifically, the storage position $OF_i$ of the characteristic point data for the line attached to the overlap symbol corresponding to the same line-kind-identifying number as that of the overlap symbol being searched is determined by referring to the overlap symbol registration table, and the characteristic point data for that line is read out, whereupon it is determined whether or not that line has a segment which intersects or touches the path within the range for search. In case the line has the segment in question, CN is updated to prepare the search information table II, III or IV. In other words, when the touch point (hereinafter referred to as the second type touch point) is detected, CN is incremented by 1 (one) to prepare the table II (steps 148 and 150). At that time, CP is stored as $B_1$. In table II, the labels $LW_2$, $LAP_2$, $LAS_2$, $LAE_2$, $CX_2$, $CY_2$ represent the same type of data as those represented by the similar labels in the table I. Preparation of the table II differs from that of the table I in that $MAP_2$ is stored. This data $MAP_2$ represents the memory location at which the characteristic point data of other intersecting or touching line is stored. When a plurality of the second type touch points are detected, the table II is prepared for each of them.

Upon detection of the cross-point (intersection), CN is incremented by 2 to prepare the tables III and IV (steps 151 and 153). Also in these tables, the labels CP, $LW_i$, $LAP_i$, $LAS_i$, $LAE_i$, $CX_i$, $CY_i$ and $MAP_i$ represent similar definitions as in the case of the tables I and II. It is noted that, in the tables III and IV, legends MAS and MAE are additionally provided, wherein MAS represents the memory location for the data of one end of a segment of the other intersecting line, while MAE represents the characteristic point of the other end of the same segment. When a plurality of cross-points are detected, the tables III and IV are prepared for each of the detected cross-points.

When the processing (steps 140 to 153) results in a determination that neither a touching line nor an intersecting line is present (i.e. CN=0), the range for search is changed for carrying out the search again (steps 152 and 130). The start point of the updated range for search coincides with the end point of the preceding search range, while the end point of the updated searching range coincides with the next characteristic point lying in the designated direction. Within this new searching range, the same processing (steps 138 to 153) as mentioned above is repeated. The processings described so far are repetitively executed until CN becomes equal to 0 (zero).

In repetition of the processing, it is determined whether the end point of the instant searching range coincides with a terminal point or not (step 158). If so, it is then determined whether the terminal point is for a closed pattern, i.e. whether the start terminal point coincides with the end terminal point (step 160). When it is found that the instant end point coincides with a terminal point which is not for a closed pattern, the searching comes to an end since no path to be searched in succession is present. However, when the instant end point coincides with a terminal point which is not for a closed pattern, the searching range is changed or altered (step 130) to continue the search for a new section. The newly established or updated range for the searching extends from the instant end point to the next characteristic point. When the searching is repeated within the updated search range, there may arise such a case in which the first or starting search range should be designated as the next searching range. To avoid such situation, it is checked whether all the search ranges have been employed (step 132). If the result proves affirmative, the searching is discontinued.

When there arises a case in which CN is not equal to 0 (zero) in the course of the searching with the range being changed (step 152), alteration of the searching range is no longer effected, but the check is made as to whether CN is equal to 1 or more. When it is found that CN is equal to 1, this means that a line is detected for the overlap symbol in question, whereupon the searching is discontinued.

Unless CN=0, a sorting processing is executed for sorting or rearranging the contents of the search information table stored in the work memory on the order of small to large values of the distance between the overlap symbol being searched and the detected touch point or cross-point, whereby only the constituent corresponding to the minimum distance is retained with the remaining constituents being erased (step 156). At that time, the value of CN is modified to the number retained in the searching information table. The sorting processing (step 156) is executed by making use of the distance information $LW_i$. In this connection, when a cross-point is selected as the point having the minimum distance, the two search information tables III and IV for that point are held as they are. At that time, CN takes the value of 2. On the other hand, when the first type or second type touch point mentioned hereinbefore is selected as the point having the minimum distance only the table I or II is left. At that time, CN takes the value of 1 (one).

Selection Of Candidate For Line Path

Figure 15:
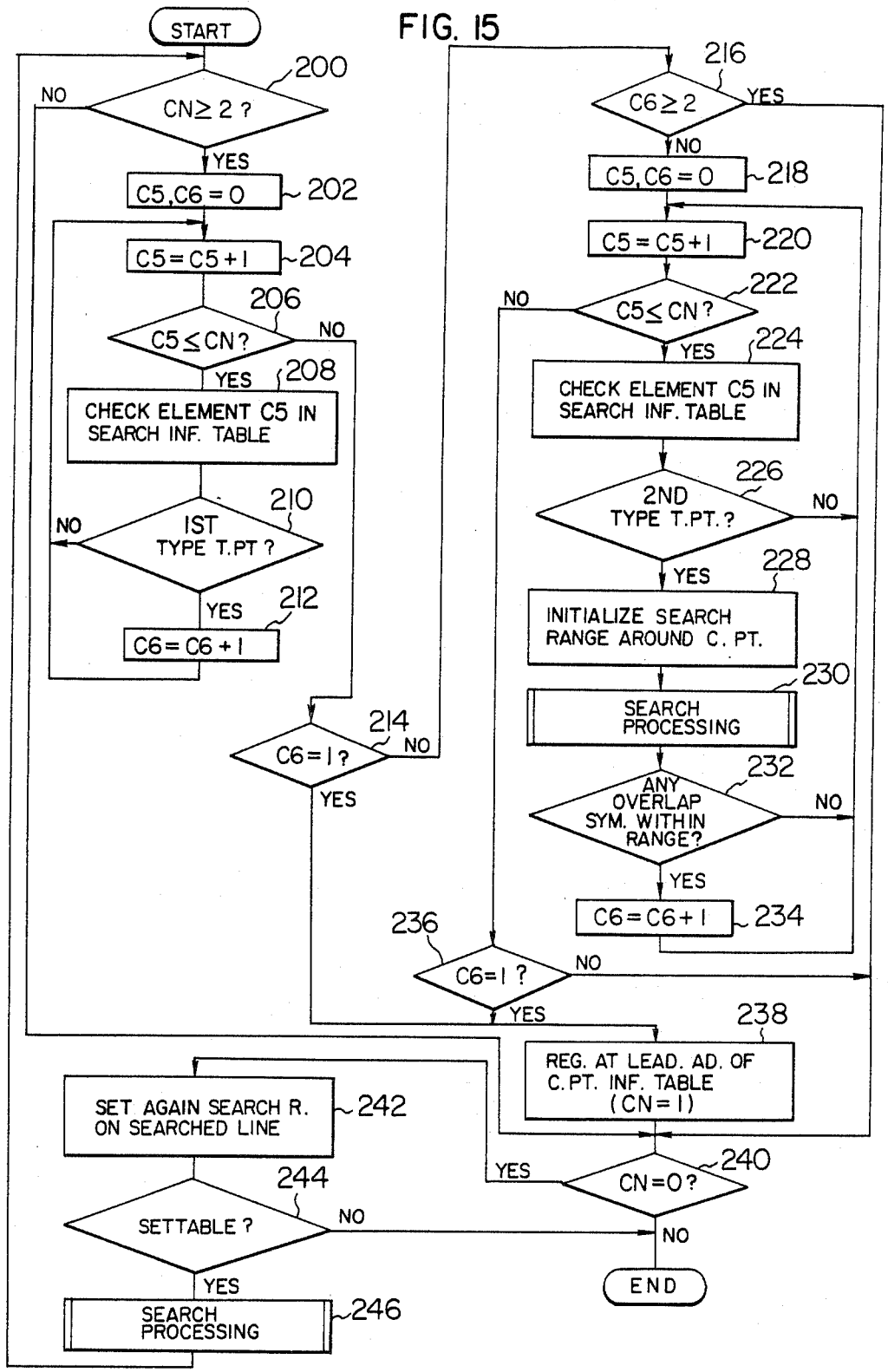
FIG. 15 is a flow chart illustrating a processing for selecting a candidate for the line path.

Reference is made to FIG. 15. When the value of CN is equal to 1 (one) upon completion of the search processing, the path which the line corresponding to the overlap symbol as searched can take is determined. Accordingly, the selection of a candidate for the line path is made only when the value of CN is 2 or more upon completion of the search processing (step 200).

At first, the search information table prepared through the search processing and stored in the work memory is checked to ascertain whether there are present two or more first type touch points (steps 202 to 212). A reference letter C5 denotes a counter for indicating the location of the searched information storage table, and C6 denotes a counter for counting the number of appearances of the first type touch point.

Next, after the counters C5 and C6 are set to 0 (zero), the number of the second type touch points registered in the searched information storage table placed in the work memory is checked. Subsequently, the range for the search processing is initially set on the intersecting or touching line starting from the position of a cross-point or touch point stored in the searched information storage table (step 228), to allow the search processing to be executed (step 230). The second search information obtained in the course of execution of the search processing is stored in the format similar to the one shown in FIG. 14, whereupon the sorting processing is executed in the same manner as described hereinbefore in conjunction with the sorting in dependence on the distance from the cross-point or touch point at which the searching is initiated. It is determined whether there is present an overlap symbol of the same kind as that of the overlap symbol being searched on the intersecting or touching line between the intersecting or touching position at which the searching has been initiated and the second intersecting or touching position obtained from the search processing (step 232). In case the overlap symbol is present, this means that a candidate for the path of an overlapping line in the relevant direction is present. Accordingly, the content of the counter C6 is incremented by 1 (one) at a step 234.

The processing mentioned above is repeated for each of the items registered in the search information storage table (steps 220 to 234). When the value or content of the counter C6 results in 1 (one) after the repetition of the processing, the relevant cross-point information is transferred to the leading address of the cross-point information table, whereupon CN is set equal to 1 (one) at a step 238.

After execution of the processing from the step 200 to the step 238, inclusive, the value of CN in the cross-point information registration table is referred to, to thereby check whether or not CN=0 (step 240). In case CN=0, this means that neither a touching nor intersection condition is present on the line which is related to a overlap symbol for which a search is being made. As the consequence, the search range is again set on the path being searched starting from the touch point or cross-point, to execute the search processing (step 246). Thereafter, the step 200 is regained.

Estimation And Registration Of Overlapping Line

The counter value CN in the cross-point information storage table is considered after the processing for selecting a candidate for the line path. Only when CN=1, can estimation of the overlapping line be definitely made. In this case, it is estimated that an overlapping line is present along the path covered by the search range or window which has been enlarged until then, whereupon the path information (i.e. the characteristic points such as the bending point and the terminal points) is again registered in the characteristic point memory as the information of the line having the same line type as the one represented by the overlap symbol in question. More specifically, data of the location $(X_i, Y_i)$ in the overlap symbol registration table shown in FIG. 11 at which an overlap symbol is present and the location on the segment associated with the overlap symbol at which intersection or touch point with the line of the same line kind as the one represented by the overlap symbol is present are read out from the areas $LAS_1$ and $LAE_1$ of the cross-point information storage table shown in FIG. 14 and registered in the characteristic point memory implemented in the same format as shown in FIGS. 8 and 9 together with the location data $(CX_1; CY_1)$ at which the intersection is actually present on the segment in question. However, at the step for determining whether there is the touch point with a line of the same line kind as the one represented by the overlap symbol in the search processing illustrated in FIG. 12, the line path re-entered in the characteristic point memory constitutes an object to be processed.

Connection Of Overlapping Lines

Figure 16:
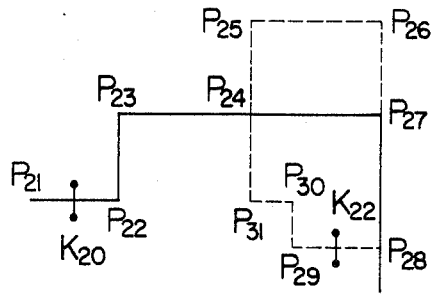
FIG. 16 is a schematic diagram for illustrating a procedure for selecting a candidate for a line path in concern.
Figure 17:
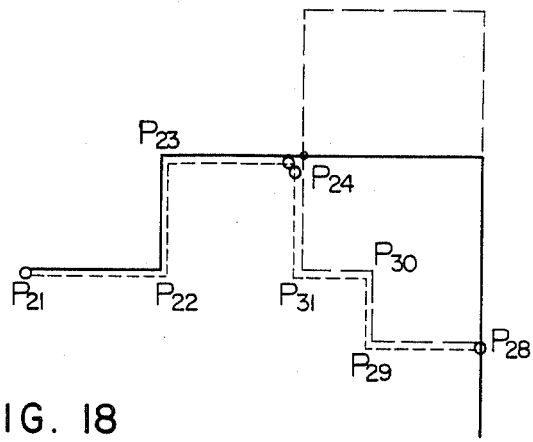
FIG. 17 is a schematic diagram for illustrating a procedure for interconnection of lines.
Figure 18:
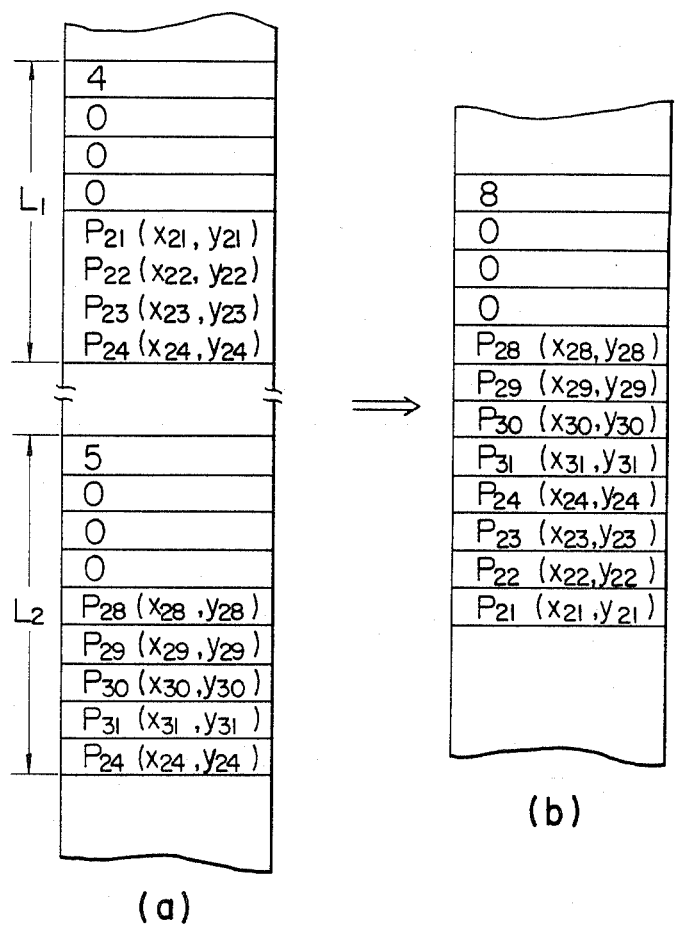
FIG. 18 is a view for illustrating example of characteristic point data for the line interconnection processing.

Taking advantage of the terminal points of the overlapping lines stored in the characteristic point memory in the format shown in FIG. 8, a process is executed for interconnecting the line patterns having the coordinates of the terminal points coinciding with each other. Assuming, by way of example, that such overlapping broken (i.e. dash and long dash) line paths $L_1$ ($P_{21}$-$P_{22}$-$P_{23}$-$P_{24}$) and $L_2$ ($P_{28}$-$P_{29}$-$P_{30}$-$P_{31}$-$P_{24}$) as shown in FIG. 17 have been additionally registered as a result of processing the overlap symbols $K_{20}$ and $K_{22}$ which are shown in FIG. 16 and represent these broken lines, respectively, the coordinates of the terminal point $P_{24}$ coincide with each other for these two lines. Accordingly, these two lines $L_1$ and $L_2$ are connected to each other at the terminal point $P_{24}$ through the processing for connection of the overlapping lines by preparing a table shown in FIG. 18 at (b). FIG. 16 is a schematic diagram for illustrating in a concrete manner a processing for determining the searching direction. It is assumed, by way of example, that an overlap symbol $K_{20}$ representative of an overlapping broken line is present on a solid line path $P_{21}-P_{22}-P_{23}-P_{27}-P_{28}$ and that an overlap symbol $K_{22}$ also representing an overlapping broken line is present on a chain line path $P_{28}-P_{29}-P_{30}-P_{31}-P_{25}-P_{26}-P_{27}$.

It is preliminarily assumed that the process of enlarging the searching range or window about the overlap symbol $K_{20}$ results in a pair of the cross-point or intersection information at the cross-point $P_{24}$, i.e. information about the direction of the segment $P_{24}-P_{25}$ and the direction of the segment $P_{24}-P_{31}$. In the direction determining processing, the searching is effected in these two directions, respectively, to check whether an overlap symbol appears before reaching the next boundary or terminal point. The direction in which no overlap symbol is present is excluded from the candidate for the search. More specifically, the searching made in the direction conforming to the segment $P_{24}-P_{25}$ will reach the terminal point $P_{27}$. Since no overlap symbol is present on the line path $P_{24}-P_{25}-P_{26}-P_{27}$, this direction is excluded from the candidate for the search. On the other hand, the overlap symbol $K_{22}$ is present in the direction conforming to the segment $P_{24}-P_{31}$.

In the foregoing, description has been made in connection with the flow of processings for recognizing the overlapping line paths. In the following, elucidation will be made in conjunction with a concrete example.

It is assumed that the line pattern or drawing shown in FIG. 4 is the object to be processed and that the solid line path $P_1-P_2-P_3-P_4-P_6-P_7-P_1$, the overlap symbols $K_1$ and $K_2$, the dash line path $P_1-P_{12}-P_{11}-P_4$ and the long dash line path $P_7-P_8-P_9-P_{10}-P_5$ are stored in the characteristic point memory in the formats shown in FIGS. 8 and 9 as a result of the line path recognition processings executed by the line path recognition apparatus.

In the first place, recognition of the overlap symbols is carried out. Among the solid line constituents stored in the characteristic point memory, those line constituents or elements which may become candidates for the overlap symbols are searched. As a result, the line element $K_1$ intersecting the line segment $P_1-P_7$ and the line element $K_2$ which intersects the segment $P_2-P_3$ are recognized to be overlap symbols, respectively, whereupon the overlap symbol registration table of the format shown in FIG. 11 is prepared and stored in the work memory. In this connection, it should be mentioned that $K_1$ is recognized as the overlap symbol representative of an overlapping long dash line, while $K_2$ is recognized as the symbol corresponding to an overlapping dash line. Next, the location where the overlap symbol is present is read out from the leading address of the overlap symbol registration table. Starting from the location thus detected, the searching range or window is progressively enlarged. More specifically, the searching range or window enlarging processing is carried out for the overlap symbol $K_1$. Since the start terminal point of the line segment intersected by the overlap symbol $K_1$ is $P_1$, the searching range or window covers the segment $K_1-P_7$. The point $P_7$ coincides with the terminal point of the long dash line which is the same as the one represented by the overlap symbol $K_1$. As a consequence, the condition for discontinuing the search is met, whereupon the searching window enlarging processing in the direction conforming to the segment $K_1-P_7$ is terminated. At the time, the line path $K_1-P_7$ is re-entered in the characteristic point memory 5 through the overlap line estimation and registration processing. Since the line path is not closed after the overlap symbol estimation and registration, the search range enlarging processing is effected in the direction toward the end terminal point starting from the overlap symbol $K_1$. In this case, the search range directed toward the end terminal point covers the line path $K_1-P_1$. Within this search range, the boundary conditions, i.e. touch point with the terminal point of the long dash line and intersection or touch point with the line attached with the overlap symbol corresponding to the long dash line are not met. Accordingly, the search range is extended to $P_2$. Within this updated search range, the above mentioned boundary conditions are not yet satisfied. Thus, the search range is further extended. At the point $P_5$, the solid line touches the terminal point of the long dash line which is of the line kind represented by the overlap symbol $K_1$. Thus, the condition for terminating the searching is met, whereupon the search range enlarging processing in the direction toward the end terminal point (conforming to the direction of $K_1-P_1$) is terminated. At this time, the long dash path $K_1-P_1-P_2-P_3-P_4-P_5$ is re-entered in the characteristic point memory through the overlapping line estimation and registration processing. The processing for the overlap symbol $K_2$ representing an overlapping dash line is carried out in the manner similar to the processings for the overlap symbol $K_1$. Accordingly, further description of the processing for $K_2$ will be unnecessary.

It will now be understood from the foregoing description that the line recognition method according to the present invention applied to the drawings drafted in accordance with the rules also taught by the invention allows a plurality of overlapping lines of different kinds to be automatically and discriminatively recognized while making it possible to estimate the paths of the lines represented by the overlap symbols.

The line recognizing operation according to the invention can be applied to general types of drawings. Further, the drawing which constitutes the object to be processed for the line recognition may include lines of specified colors and/or thicknesses in addition to the kinds of lines such as solid line, dash line, long dash line and chain line.

We claim:

1. A method for recognizing various kinds of lines drafted on a drawing in an apparatus which recognizes the lines based upon an image data signal obtained by scanning the drawing, comprising the steps of:

recognizing lines and overlap symbols drafted on the drawing, based upon the image data signal, to obtain data representative of a position and a line kind of each of the lines and data representative of a position and a symbol kind of each of the overlap symbols, wherein said lines and said overlap symbols are drafted on the drawing in such a manner that when at least two lines to be drafted overlap each other along a path, only one of the two lines is drawn along the path, and an overlap symbol is attached to the one line at a point along the path in order to represent presence of the other line not drawn, said overlap symbol being determined depending upon a line kind of the other line not drafted; and generating data representative of positions and line kinds of lines not drawn on the drawing but represented by the recognized overlap symbols, based upon the obtained data.

2. A method according to claim 1, wherein said generation of data representative of the lines not drawn includes the steps of:

detecting a first line for each of the recognized overlap symbols among the recognized lines to which first line each of the recognized overlap symbols is attached on the drawing, based upon the obtained data representative of the positions of the recognized lines and the position of each recognized overlap symbol;

determining first and second points at different sides of each overlap symbol on the first line detected for each recognized overlap symbol based upon relative positional relationship between the first line for each recognized overlap symbol and other recognized lines, so that said first and second points represent points between which a line represented by each overlap symbol is to pass along the first line for each recognized overlap symbol; and generating data representative of the line represented by each overlap symbol, comprising data representative of a position of a portion of the first line detected for each recognized overlap symbol between the first and second points detected for each recognized overlap symbol and representative of a line kind determined, depending upon each overlap symbol.

3. A method according to claim 2, wherein said determination of said first and second points for each recognized overlap symbol includes the steps of:

detecting presence of a second line for the first line detected for one of the recognized overlap symbols, wherein said second line passes through a point on the first line detected for the one recognized overlap symbol and represents a path along which a line represented by the one overlap symbol can exist;

determining the point on the second line as one of the first and second points for a line represented by the one overlap symbol.

4. A method according to claim 3, wherein said detection of the presence of a second line includes the step of detecting, as the second line for one recognized overlap signal, a line which has a terminal point on the first line detected for the one recognized overlap symbol and which has a line kind determined by a symbol kind of said one recognized overlap symbol.

5. A method according to claim 4, wherein said line kind which the second line should have is uniquely determined by the symbol kind of the one recognized overlap symbol.

6. A method according to claim 3, wherein said detection of the presence of a second line includes the step of detecting, for one recognized overlap symbol, a line which has a terminal point on the first line detected having said recognized overlap symbol attached thereto and which represents the same kind of line as the one indicated by the recognized overlap symbol.

7. A method according to claim 6, wherein said overlap symbol attached to the second line is the same as the one recognized overlap symbol.

8. A method according to claim 3, wherein said detection of presence of a second line includes the step of detecting, as the second line for one recognized overlap symbol, a line which crosses the first line detected for the one recognized overlap symbol and has a recognized overlap symbol attached thereto which represents the same line kind of line as the one recognized overlap symbol does.

9. A method according to claim 8, wherein said overlap symbol attached to the second line is the same as the one recognized overlap symbol.

10. A method according to claim 3, wherein, when plural lines are detected each as the second line, one of the plural lines is selected as the second line which defines one of the first and second points for the one recognized overlap symbol, wherein said one of the plural lines passes through a point on the first line nearest to the one recognized overlap symbol among points on the first line through which said plural lines pass.

11. A method according to claim 3, wherein said determination of the first and the second points for each recognized overlap symbol further includes the steps of:

detecting a terminal point of the first line detected for the one overlap symbol;

determining the terminal point as one of the first and second points on the first line detected for the one recognized overlap symbol.

12. A method according to claim 3, wherein said generation of the data for the line for the one recognized overlap symbol includes the step of generating data representing a line obtained by connecting the line portion between the first and second points of the first line for the one detected overlap symbol and the second line.

13. A method according to claim 2, wherein, when plural overlap symbols of the same kind are recognized as attached to the same line within said recognized lines, said detection of the first and second points is done for only 14. A method according to claim 1, wherein the line kind of the line represented by each recognized overlap symbol is uniquely determined depending upon a symbol kind of each recognized overlap symbol.

15. A method according to claim 1, wherein lines of different colors are treated as having different line kinds.

16. A method according to claim 1, wherein overlap symbols of different colors are treated as representing different line kinds.

17. A method according to claim 1, wherein one of the recognized overlap symbols has a line pattern having a predetermined length and oriented perpendicular to a line to which the one overlap symbol is attached.

18. A method according to claim 1, wherein one of the recognized overlap symbols has: a line pattern having a predetermined length and provided perpendicular to a line to which the one recognized overlap symbol is attached; and a dot pattern having a predetermined size and provided at an end of the line pattern.

19. A method according to claim 1, wherein said data representative of a position of each overlap symbol represents a position of a predetermined point within each overlap symbol, wherein the point of each overlap symbol is expected to lie on one of lines drafted on the drawing.

20. A method according to claim 1, wherein said data representative of a position of each recognized line comprises data representing characteristic points of each recognized line such as a bending point, start terminal point and end terminal point.

21. A method according to claim 1, wherein one of drawing lines is a chain line.

22. A method according to claim 1, wherein one of drawn lines is a dash line.

23. A recognition apparatus, comprising:
- a photo-electric converter means for scanning a drawing to generate an image data signal representative of patterns on the drawing;
- first memory means connected to said photo-electric converter means for holding the image data signal;
- first recognition means connected to said first memory means for recognizing lines and overlap symbols drafted on the drawing, based upon the image data signal, to obtain data representative of a position and a line kind of each of the lines and data representative of a position and a symbol kind of each of the overlap symbols, wherein said lines and said overlap symbols are drafted on the drawing in such a manner that when at least two lines to be drafted overlap each other along a path, only one of the two lines is drafted along the path, and an overlap symbol is attached to the one line at a point along the path in order to represent presence of the other line not drafted, said overlap symbol being determined depending upon a line kind of the other line not drafted;
- second memory means connected to said first recognition means for holding the data obtained by said first recognition means; and
- second recognition means connected to said second memory means for generating data representative of positions and line kinds of lines not drawn on the drawing but represented by the recognized overlap symbols, based upon the data held by said second memory means.

24. A recognition apparatus according to claim 23, wherein said data representative of a position of each recognized line comprises data representing characteristic points of each recognized line such as a bending point, start terminal point and end terminal point.

25. A recognition apparatus according to claim 23, wherein said first recognition means includes:
- first microprocessor means connected to the first memory means;
- third memory means for holding program instructions to control said first microprocessor to recognize the lines and the overlap symbols drawn on the drawing based upon the image data signal held by said first memory means; and
- bus means for connecting said first to third memory means to said first microprocessor means; and
wherein said second recognition means includes:
- second microprocessor means connected to said first microprocessor means;
- fourth memory means for holding program instructions to control said second microprocessor means to generate the data representative of positions and line kinds of the lines not drawn but represented by the recognized overlap symbols; and
- bus means for connecting said second and fourth memory means to said second microprocessor means.

* * * * *